US005157886A

United States Patent [19]

Azzar et al.

[11] Patent Number: 5,157,886

[45] Date of Patent: Oct. 27, 1992

[54] EXTRUDED ELASTOMERIC BASEBOARD MOLDING STRIP

[75] Inventors: James D. Azzar, E. Grand Rapids; Mark Rainbolt, Grand Rapids, both of Mich.

[73] Assignee: Extrusions Division Incorporated, Grand Rapids, Mich.

[21] Appl. No.: 661,934

[22] Filed: Feb. 28, 1991

[51] Int. Cl.[5] .................... E04C 2/38

[52] U.S. Cl. .................... 52/716; 52/288; 52/312

[58] Field of Search .................... 52/716, 718, 312, 315, 52/314, 388, 389, 287, 288, 272, 273

[56] References Cited

U.S. PATENT DOCUMENTS

| | | | |
|---|---|---|---|
| 356,523 | 1/1887 | Chalifoux | 52/312 |
| 2,111,922 | 3/1938 | Borkenstein | 52/716 |
| 2,509,037 | 5/1950 | Flicker | 52/716 X |
| 3,335,429 | 8/1967 | Arp | 52/716 |
| 3,408,250 | 10/1968 | Finefrock | 52/716 |
| 3,609,927 | 10/1971 | Wine | 52/716 X |

FOREIGN PATENT DOCUMENTS

| | | | |
|---|---|---|---|
| 2729757 | 1/1979 | Fed. Rep. of Germany | 52/716 |
| 2854363 | 11/1979 | Fed. Rep. of Germany | 52/716 |
| 845026 | 8/1960 | United Kingdom | 52/716 |

*Primary Examiner*—David A. Scherbel
*Assistant Examiner*—Kien Nguyen
*Attorney, Agent, or Firm*—Sughrue, Mion, Zinn, Macpeak & Seas

[57] ABSTRACT

An extruded, thermoplastic baseboard elastomeric molding strip having opposed generally flat front and rear surfaces is provided with a plurality of closely vertically, spaced horizontal, parallel ribs projecting outwardly of the flat front surface over the full surface area thereof. The strip is formed of front and rear surface layers of thermoplastic material of the same durometer hardness with the front surface layer forming at least the tips of the front surface ribs being of a low density thermoplastic material and the balance of the strip being of high density thermoplastic material. The front and rear surface layers may be of contrasting colors. The rear surface of the strip is preferably formed with concave grooves separated by a multiplicity of fine, vertically spaced horizontal, parallel rearwardly projecting ribs with a rear, center rib between adjacent fine ribs, of a larger diameter than adjacent fine ribs separating the rear surface grooves. The rear surface configuration facilitates removing of excess wet adhesive and maintenance of flush adhesive mounting of the molding strip to a building vertical wall.

9 Claims, 1 Drawing Sheet

FIG. 1
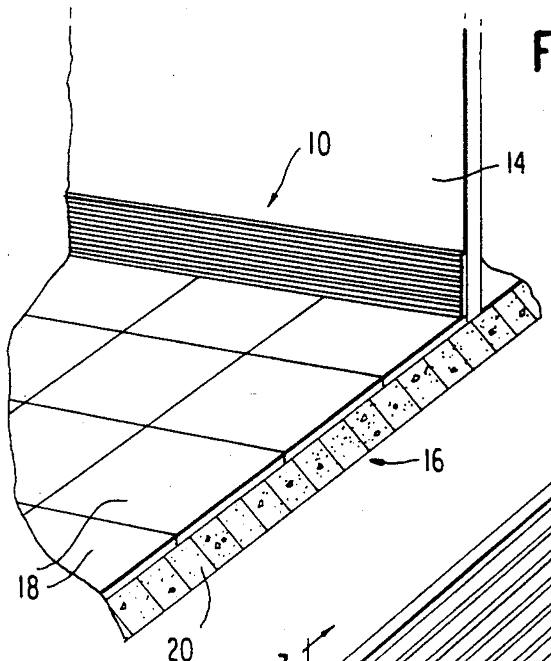
FIG. 2
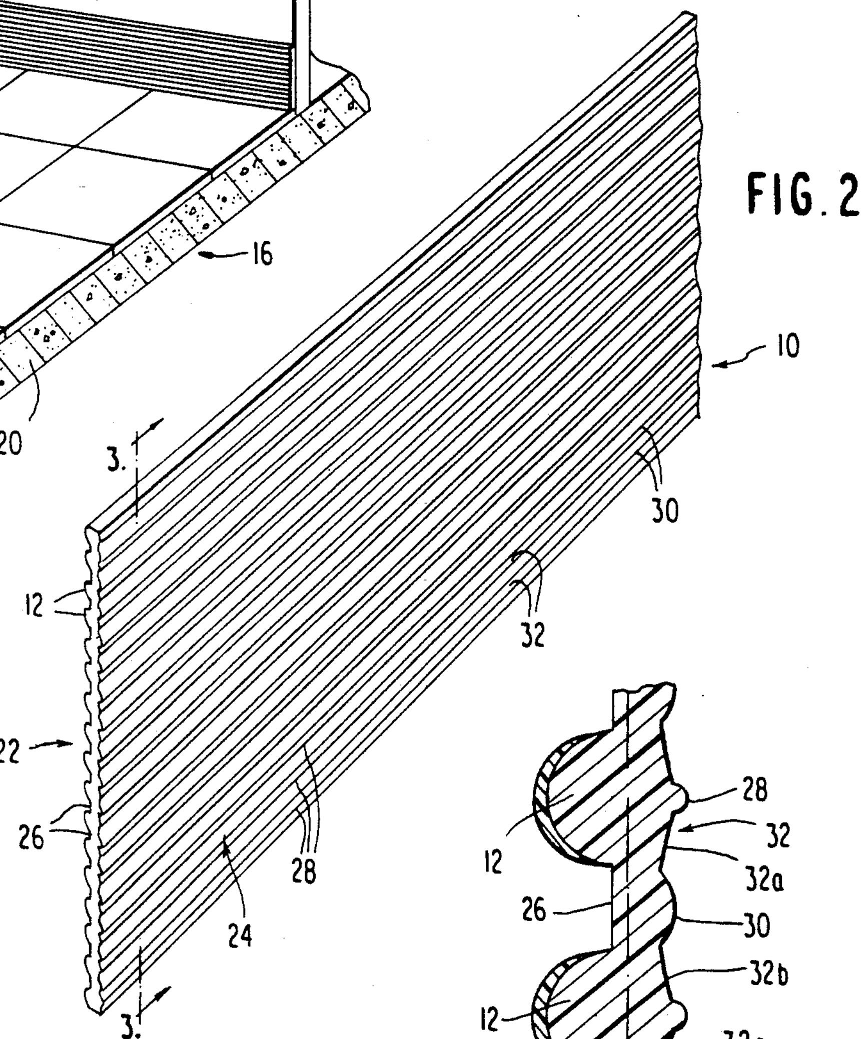
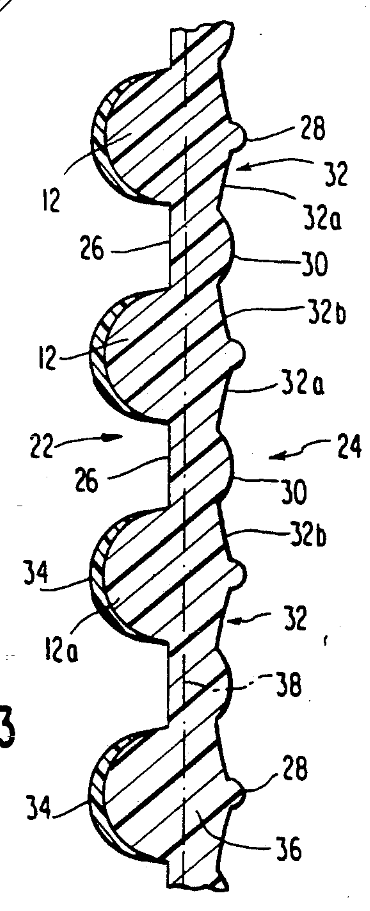
FIG. 3

EXTRUDED ELASTOMERIC BASEBOARD MOLDING STRIP

FIELD OF THE INVENTION

This invention relates to a extruded, plastic baseboard molding strip and more particularly to an extruded plastic strip having closely spaced parallel ribs on a front surface thereof, which is scuff resistant, and highly colorable, and on an opposite, rear surface which permits adhesive application thereto and means for control of the removal of excess adhesive and particularly configured to prevent telegraphing through the extruded plastic membrane, surface irregularities on the wall covered by the molding strip.

BACKGROUND OF THE INVENTION

Extruded plastic baseboard molding strips, are in current vogue particularly adaptable to mounting to a vertical building wall or a vertical partition wall of the same adjacent its intersection with the floor.

U.S. Pat. No. 3,408,250 issued to D. W. Finefrock, Oct. 29, 1968, is exemplary of such extruded plastic molding strips. U.S. Pat. No. 3,408,250, notes the conventionality of applying such elastomeric baseboard molding strip to a wall after first laying a length of a molding strip onto the floor and brushing a suitable paste or adhesive, such as linoleum paste, on the entire wall contacting surface of the molding strip and then pressing the elastomeric molding strip against the flat surface of the vertical wall to receive the same.

The problem in such application is the inability to avoid smearing and bleeding of the paste onto exposed surfaces of the wall, floor and the molding strip itself. As a result, substantial time and labor are required in wiping up excess paste while it is still wet.

U.S. Pat. No. 3,408,250, overcomes that problem by using pressure sensitive adhesive on the rear, wall contacting surface of the baseboard molding strip, which pressure sensitive adhesive may cover the entire rear, wall contacting surface of the molding strip or at selected areas such as the top and bottom edge areas of the molding strip. The extruded elastomeric material strip in U.S. Pat. No. 3,408,250, includes a wall contacting portion and an integral floor engaging foot portion which extends outwardly at an obtuse angle from the wall contacting portion at the bottom edge of the extruded elastomeric material strip. The rear, wall engaging surface is provided with a multiplicity of a horizontally extending, vertically spaced ribs which provide a multiplicity of pressure points thereby assuring an effective seal between the rear surface of the strip and the vertical wall to which it is attached. The ribs project outwardly of the extruded strip rear surface. The opposite, front surface of the extruded strip wall contacting portion, is flat and smooth.

While, the utilization of a pressure sensitive adhesive preapplied to the extruded baseboard molding strip permits pressure application against the vertical wall to which the baseboard molding strip is attached and which may initially adhere satisfactorily, depending upon the climate, either the adhesive itself, the extrusion substrate material or both may be adversely affected, destroying the adhesion between the extruded strip and the building wall and, under extreme conditions, a deterioration or partial destruction of the substrate material itself.

Further, the plain, smooth, flat front surface of the extruded elastomeric baseboard molding strip, is itself rather unappealing. Importantly, surface irregularities on the building vertical wall are telegraphed through the extruded membrane giving a lumpy look to the flat front, vertical surface of that molding strip.

It is therefore, a primary object of the present invention to provide an improved, extruded plastic baseboard molding strip characterized by a front surface with a unique, linear visual effect which is completely different from existing baseboard molding strip products, using an extruded plastic substrate material which is highly stable climatically, easy to cut and work with, is cost effective, has a front surface outer skin which is scuff and mar resistant and highly colorable, in which a surface layer at the rear of the strip is contoured to facilitate the application of adhesive to that surface and which allows excess adhesive to be readily removed therefrom and which prevents the telegraphing of surface discontinuities of the vertical wall to which the strip is attached through the extruded membrane.

It is a further object of the present invention to provide such an extruded plastic baseboard molding strip in which the extruded plastic material provides a linear visual appearance to the front surface of the extruded strip of contrasting colors, which is enhanced in terms of scuff resistance and which is of lighter density from that of a second surface layer proximate to the rear surface of the extruded plastic strip, and which second, rear surface layer facilitates maintenance of the adhesive seal between the rear surface of the extruded plastic baseboard molding strip, and the front surface of the vertical building wall.

Brief Description of the Drawings

FIG. 1 is a fragmentary perspective view of an intersection between a building wall and a floor structure illustrating a preferred embodiment of the extruded plastic molding strip of the present invention.

FIG. 2 is an enlarged, fragmentary perspective view of the molding strip of FIG. 1.

FIG. 3 is a further enlarged, fragmentary cross sectional view of the strip of FIGS. 1 and 2 taken about line 3—3 of FIG. 2.

DESCRIPTION OF THE PREFERRED EMBODIMENT

Referring to the drawings, the perspective view of FIG. 1 illustrates the positioning and placement of an extruded thermoplastic baseboard elastomeric molding strip indicated generally at 10, as applied to a lower edge of a vertical building or partition wall 14, which wall extends vertically upwardly from a floor indicated generally at 16. The floor 16 is formed by a poured concrete slab 20 having a flat horizontal upper surface upon which is laid a plurality of rectangular floor tiles 18. The vertical wall 14 may be formed of plasterboard and may be backed by laterally spaced vertical studs (not shown) typically formed of 2×4 wooden members. As is apparent from the enlarged perspective view of FIG. 2 and the sectional view of FIG. 3, the front surface 22 of the extruded plastic baseboard molding strip 10 is provided with a plurality of vertically spaced ribs 12 of generally convex semicircular cross section, separated by flat surface portions 26. The opposite, rear surface 24 of the extruded strip 10 is provided with a series of fine, outwardly projecting, horizontal, small diameter convex ribs 28, forming upper and lower ends of shallow concave grooves indicated generally at 32. Grooves 32 have oppositely oblique surface portions 32*a*, 32*b* separated by an, outwardly projecting, semicircular convex rib 30, the diameter of which is considerably in excess of the diameter of the fine, parallel ribs 28 forming the top and bottom ends of each groove 32. The fine, small diameter ribs 28, form a multiplicity pressure points which facilitate a seal between the rear surface 24 of the plastic extruded baseboard molding strip 10 and the front surface of wall 14 to which the strip is adhesively mounted, FIG. 1. Further, while the fine, small diameter ribs 28 are of a diameter which is less than that of ribs 30 centered within the concave grooves 32, the grooves 32 being concave, ensure that the larger diameter ribs 30 centered within the grooves 32, between paired ribs 28, do not project outwardly beyond a plane formed by the fine ribs 28 which project outwardly of the extruded strip 10.

Preferably, the extruded plastic baseboard molding strip 10 is formed of a suitable plastic such as polyvinyl chloride (PVC) which is relatively soft and which has a uniform durometer hardness throughout the thickness of the extruded strip. However, it is preferred that the strip 10 be extruded through a dual orifice die, which permits the flow of two streams thermoplastic polyvinyl chloride (or similar plastic) at the extrusion orifice area forming, a dual layer strip 10 of plastic material, i.e. a base or rear layer 36, of the extruded strip 10 as per FIG. 3, and a front surface layer 34. In the illustrated embodiment, only the outer surface layer portion of the tips 12*a* of front surface ribs 12, which are of a semicircular configuration and which project outwardly of flat, front surface 22 of the extruded member 10 carry front surface layer 34 material. While the durometer hardness is normally the same for the two surface layers of extruded polyvinyl chloride strip 10, the rear or base layer 36 is of a much higher density than that of front layer 34 and forming, at least, the outer surface portions of the tips of ribs 12. As such, the ribs are highly scuff and mar resistant and at the same time because such plastic layer 34 is of low density and free of filler, the material of the front surface layer 34 can be rendered highly colorable.

This normally permits the creation of outer, rib surfaces of a contrasting color along with that of the flat, short vertical height front surface areas 26 between each of the outwardly projecting ribs 12. However, in the illustrated embodiment only the tips of the ribs 10 are contrastingly colored. Conventionally, as evidenced by a dotted line 38 extending vertically through the extrusion 10, the front layer 34 portion of the extruded plastic baseboard molding strip 10 which extends to dotted line 38 may be of contrastingly colored plastic, have the same durometer hardness, and provide a scuff and mar resistant, highly colorable, front surface layer to the strip 10. The plastic material 36 (polyvinyl chloride or the other plastic) to the right of the vertical dotted line 38, FIG. 3 is of the much higher density by incorporation of a high proportion of filler such as 40% to 60%, with the plastic material 34 being a low filler plastic of 5% to 10% filler, in the illustrated embodiments. In somewhat the manner as described in U.S. Pat. No. 3,408,250, a suitable adhesive such as linoleum paste may be applied by a spatula or other appropriate tool to the rear surface 24 of the extruded plastic strip 10 and the excess material scraped off with the edge of the scraper in contact with the fine ribs 28, prior to applying the wet adhesive coated rear surface 24 of strip 10 against the front surface of the vertical wall 14 of the building mounting receiving the same, FIG. 1.

It should be appreciated, that the configuration and size of the ribs 28 defining the individual grooves 32 and that of the central, reawardly projecting rib 30, of larger diameter and intermediate of the fine ribs 28, may be readily varied, as well as the configuration of the concave grooves 32 molded into the extruded plastic strip 10 without departing from the spirit of the invention.

For instance, the groove 32 may be concave by utilizing flat surfaces which are oppositely oblique extending, outwardly and reawardly from the central rib 30 to the fine, small diameter ribs 28 for each groove 32. The grooves are then shallow V grooves rather than shallow arcuate grooves as seen in the illustrated embodiment of the invention. In the specific embodiment, it is preferred that the thermoplastic material extruded to form strip 10 be polyvinyl chloride (PVC), with the filler added to the polyvinyl chloride forming the high rear surface layer 36 of the extrusion being calcium carbonate, clays, or equivalent. Typically, such extrusions occur with dual molten polyvinyl chloride flows extruded through to a common extrusion head, head at a temperature of 340° F. to 365° F. and as laminar flows so that a smooth interface is formed between the filler material polyvinyl chloride content 36, and that at 34 lacking the filler and being of significant lower density. The durometer hardness of the PVC strip 10 forming a preferred embodiment of the invention is typically in the range of 87 to 95 durometer Shore A.

The extrusion process forms no part of the present invention with the exception that the material when plasticized, is extruded through a die head (not shown) which may be formed of opposed mold platens forming a slit through which the molded plastic material issues as a composite of a front layer 34 and a rear layer 36. Both mold platens are formed with grooves separated from each other and extending parallel to each other to extrude, from the die head, a sheet of plastic material having ribs on both sides interconnected by a web of a plastic material such as PVC, the rear layer of which has the filler incorporated therein while the front layer is the devoid of the same. Further, the front layer carries appropriate coloring contrasting with that forming at least the rear surface layer of the extruded plastic baseboard molding strip.

While the invention has been described in connection with a preferred embodiment, it should understood that the invention is not limited to the disclosed embodiment, but the invention covers various modifications included within the spirit and scope of the claims appended hereto.

We claim:

1. In an extruded thermoplastic, elastomeric baseboard molding strip for adhesive mounting flush to a building vertical wall, said strip having a generally flat, front decorative surface and a opposite, generally flat, rear, wall contacting surface, said rear, wall contacting surface being covered by a multiplicity of vertically spaced, horizontal, parallel rearwardly projecting first ribs providing areas of localized pressure when said strip is applied to the surface of said building vertical wall with adhesive on said strip, rear, wall contacting surface, between said rearwardly projecting first ribs, the improvement comprising, a plurality of closely, vertically spaced, horizontal, second ribs projecting outwardly of said generally flat front surface of said strip and, said strip being integrally formed of front and rear surface layers of an extruded thermoplastic, elastomeric material of a same durometer hardness, said front surface layer being of low density, and said rear surface layer being of high density and wherein; said second ribs have tips, at least the tips of said front surface layer second ribs are of said low density thermoplastic material such that said second ribs are scuff resistant and wherein, said rear surface layer forming said multiplicity of vertically spaced horizontal first ribs, have grooves therebetween, providing areas of localized pressure and are formed of said high density thermoplastic material thereby preventing surface irregularities on the wall covered by the molding strip from being telegraphed through the extruded molding strip to the low density front decorative surface thereof.

2. The extruded thermoplastic baseboard molding strip as claimed in claim 1, wherein the tips of the second ribs are formed of low density thermoplastic material and, portions of the second ribs remote from the tips and the remainder of the extruded molding strip are formed of said high density thermoplastic material.

3. The extruded thermoplastic baseboard molding strip as claimed in claim 2 wherein, the rear surface layer of high density thermoplastic material and said front surface layer of low density thermoplastic material are of contrasting color.

4. The extruded thermoplastic baseboard molding strip as claimed in claim 1 wherein, the rear surface layer of high density thermoplastic material and said front surface layer of low density thermoplastic material are of contrasting color.

5. The extruded thermoplastic baseboard mounting strip as claimed in claim 1 wherein, said grooves defined by adjacent, vertically spaced first ribs are concave rearwardly, and wherein, a third horizontal rib is positioned within each of said grooves, centered said between adjacent first ribs and wherein, the height of said third rib is less than the depth of said groove.

6. The extruded thermoplastic baseboard molding strip as claimed in claim 5 wherein said first ribs and said third ribs are of convex, semicircular configuration.

7. The extruded thermoplastic baseboard molding strip as claimed in claim 5, wherein the diameter of said third rib is larger than the diameter of said adjacent first ribs to opposite sides thereof defining said groove.

8. The extruded thermoplastic baseboard molding strip as claimed in claim 5 wherein said grooves are arcuate.

9. The extruded thermoplastic baseboard molding strip as claimed in claim 1, wherein said second ribs are of convex, semicircular configuration.

* * * * *